Aug. 23, 1938.  E. D. WILSON  2,128,110
INSTRUMENT FOR MEASURING ULTRAVIOLET LIGHT
Filed Dec. 7, 1935

INVENTOR
Earl D. Wilson.
BY
ATTORNEY

Patented Aug. 23, 1938

2,128,110

UNITED STATES PATENT OFFICE 2,128,110

INSTRUMENT FOR MEASURING ULTRA-VIOLET LIGHT

Earl D. Wilson, Wilkinsburg, Pa., assignor to Westinghouse Electric & Manufacturing Company, East Pittsburgh, Pa., a corporation of Pennsylvania Application December 7, 1935, Serial No. 53,403

5 Claims. (Cl. 250—34)

This invention relates to meters, and particularly to meters which cooperate with a photocell.

It is an object of this invention to adapt such meters to the measurement of radiation of a particular sort, particularly to a selected kind of non-visible radiation.

It is a further object of this invention to produce a convenient instrument which may be easily changed for measurement of radiation of different types.

Another object of this invention is to produce an instrument which may be used for measurement of the sort of ultra-violet radiation which is frequently employed for the treatment of patients.

It is a further object of this invention to provide for interchangeable attachments to a photocell whereby it may be used either to measure ultra-violet radiation in the erythemic region or to measure X-rays.

It is a further object of this invention to provide a changeable attachment to a photocell whereby it may be adapted to the measurement of ultra-violet radiation or of X-ray radiation.

Other objects of the invention and details of the proposed structure will be apparent from the detailed description and the accompanying drawing, in which.

Figure 1:
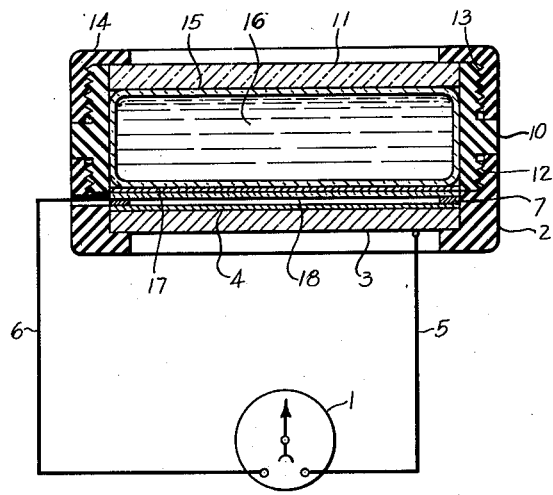
Figure 1 is a section through one form of my device.

In Fig. 1 an indicating instrument 1 preferably of the d'Arsonval microammeter type is connected to a photocell 2 having a copper disk 3 upon which is formed a layer 4 of cuprous oxide. Electrical connections are made from the copper disk to the meter by a lead 5 connected to the copper disk and a lead 6 connected to the copper oxide. In order to afford a connection to the copper oxide the face of the oxide farthest from the copper is coated with a layer of metal, preferably silver, so thin as to be transparent. It is too thin to be illustrated in the drawing. A ring 7 contacting with the silver surrounds this face of the disk and is connected to the lead 6. The connection is thus from the copper 3 through lead 5, meter 1, lead 6, and ring 7 to the silver and through to the copper oxide.

Detachably joined to the casing 2 containing the copper disk just described, a casing 10 is provided which has on the face farthest from the photocell 2 a glass cover 11. The casing is threaded at 12 to fit the threads on the casing of the photocell 2 and also at 13 to receive the cover 14 which retains the glass 11.

The cover 11 is of peculiar glass often called red-purple glass. The glass selected is a borosilicate glass transparent to ultra-violet rays and particularly transparent to the rays in the erythema region. This region is considered as being between the wave lengths of 2800 Å. and 3200 Å. The glass just mentioned transmits a small amount of light within the violet end of the visible spectrum and some ultra-violet light of longer wave length than the limit just mentioned, but it has its maximum transparency at very nearly the center of the erythema region.

A glass vessel 15 enclosed by the casing 10 and under the cover 11, transparent to the same wavelengths as the cover 11 is filled with a solution 16 of nickel sulphate. Water may be used in making the solution or a mixture of water with sufficient glycerine to prevent freezing, if the apparatus is to be used in a place of low temperature. In either case the solution is saturated so that as much nickel sulphate as possible is in the space through which the radiation must pass. The nickel sulphate solution is transparent to the radiations of the erythema region, but is opaque to the other ultra-violet and visible radiations which the above mentioned glass will pass. The face of the vessel 15 nearest the photocell 2 is coated with a layer 17 of cellulose acetate coated with potassium uranyl sulphate. When the parts are assembled the cellulose aceate is closely adjacent the glass 18 which forms the upper face of the photocell.

In the operation of the form of the device shown in Fig. 1 the face of the instrument closed by the glass 11 is exposed to the radiation to be tested. Visible radiation and nearly all other radiation is removed by the filtering action of the glass 11 and of the solution 16 in the vessel 15. The nickel sulphate in solution in the vessel 15 removes the longer waves in the radiation which has passed the glass so that the radiation which arrives at the layer 17 of cellulose acetate is almost purely that of the erythema region.

The coating of the cellulose acetate fluoresces under the action of this radiation and the intensity of the light formed by the fluorescence is almost strictly proportional to the intensity of the erythema radiation in the radiation incident upon the glass 11. The illumination from the cellulose acetate strikes upon the copper oxide layer 4 and establishes an electromotive force which produces a current through the meter 1. The reading of this meter thus gives an indication of the intensity of the radiation of the character desired in the incident radiation.

Figure 2:
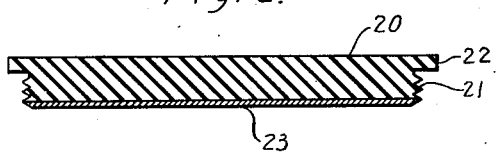
Fig. 2 is a section through a modification of the attachment.

An alternative filter is shown in Fig. 2. It comprises a piece 20 of molded material, preferably a phenol condensation product, such as Micarta or Bakelite. Any material transparent to X-rays could be used. It is threaded at 21 to fit the threads on the photocell 2 and flanged at 22 to insure its lower surface being positioned close to the glass 18. The lower surface of the piece 20 of Micarta is covered with a coating 23 of potassium uranyl sulphate. Any other substance which will fluoresce under the action of X-rays may be used if desired.

The invention is not limited to the use of a meter for measuring radiation of the particular types described. Many styles of filter for many different kinds of ultra-violet radiation may be used in connection with the photocell described.

In the use of the first mentioned form of the device the instrument is interposed in the path of the light from the arc lamp or other source of illumination with which the patient is being treated and the physician observes the reading of the meter 1. This gives him a measure of the intensity of the radiation which affects the patient free from confusion by the visible and other radiation present in the light from the lamp. The physician governs the time during which the patient should be exposed to the light by the reading of the meter 1. The higher the reading the shorter must be the time for the same dosage.

The device may be used not only in controlling the treatment of a patient, but in controlling the irradiation of bread, milk or other substances by ultra-violet light for the production of vitamin D.

Similarly, in the use of the form shown in Fig. 2, during the treatment of a patient with X-rays, the meter equipped with the cover 20 is interposed in the path of the X-rays and the reading of the meter 1 indicates to the attendant the intensity of the X-rays to which the patient is being subjected. Many other variations in detail will readily occur to those skilled in the art, therefore the specific description and the drawing are to be considered as illustrative and not limiting. The only intended limitations are those expressed in the following claims.

I claim as my invention:

1. A portable unitary device comprising an optical filter transmitting radiation of less than 3200 Å. wavelength, a material which fluoresces when influenced by such radiation located on the emergent side of the filter and a copper oxide photocell exposed to the fluorescence of said material.

2. In combination, an optical filter comprising a body of nickel sulphate solution, a cover therefor pervious to non-visible rays, a layer of potassium uranyl sulphate in position to be illuminated by the radiation transmitted by said filter, a sheet of copper oxide in position to be illuminated by fluorescence from said potassium uranyl sulphate, a sheet of copper in cooperative relation to said copper oxide and connections for an electric work circuit connected to said cooperating sheets of copper and copper oxide.

3. In combination, an optical filter comprising a body of nickel sulphate solution, a cover therefor pervious to non-visible rays, a layer of potassium uranyl sulphate, a sheet of cellulose acetate supporting said layer in position to be illuminated by the radiation transmitted by said filter, a sheet of copper oxide in position to be illuminated by fluorescence from said potassium uranyl sulphate, a sheet of copper in cooperative relation to said copper oxide and connections for an electric work circuit connected to said cooperating sheets of copper and copper oxide.

4. In combination, an optical filter comprising a cover glass of red-purple glass, a body of nickel sulphate solution, a layer of potassium uranyl sulphate in position to be illuminated by the radiation transmitted by said filter, a layer of copper oxide in position to be illuminated by fluorescence from said potassium uranyl sulphate, and formed on a sheet of copper and connections for an electric work circuit connected to said copper and copper oxide.

5. In combination, an optical filter comprising a body of phenol condensation product, a layer of potassium uranyl sulphate in position to be illuminated by the radiation transmitted by said filter, a layer of copper oxide in position to be illuminated by fluorescence from said potassium uranyl sulphate, and formed on a sheet of copper and connections for an electric work circuit connected to said copper and copper oxide.

EARL D. WILSON.